Feb. 22, 1938.　　　　E. G. BUDD　　　2,108,795
DOUBLE WALLED SHEET METAL STRUCTURE AND METHOD OF MAKING
Original Filed March 22, 1934
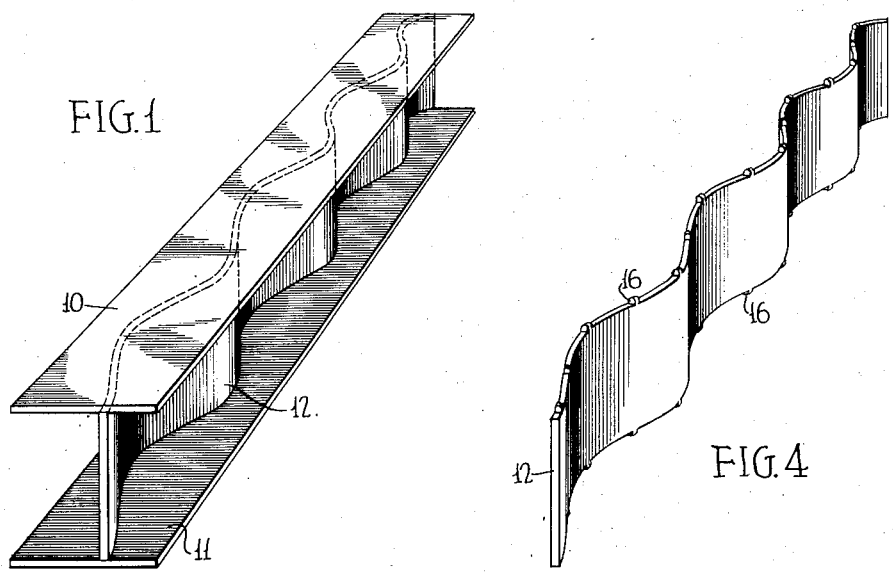
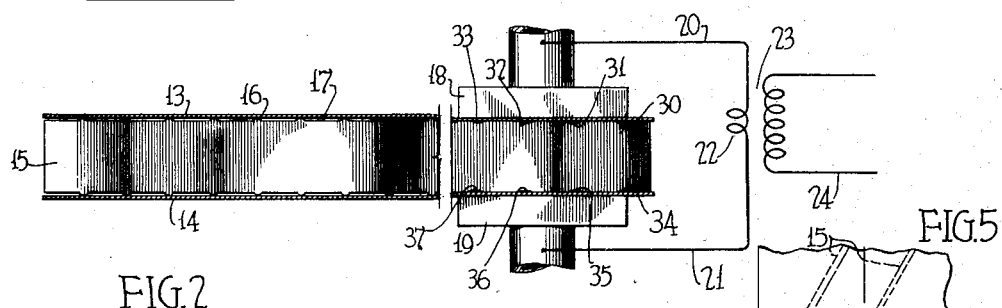
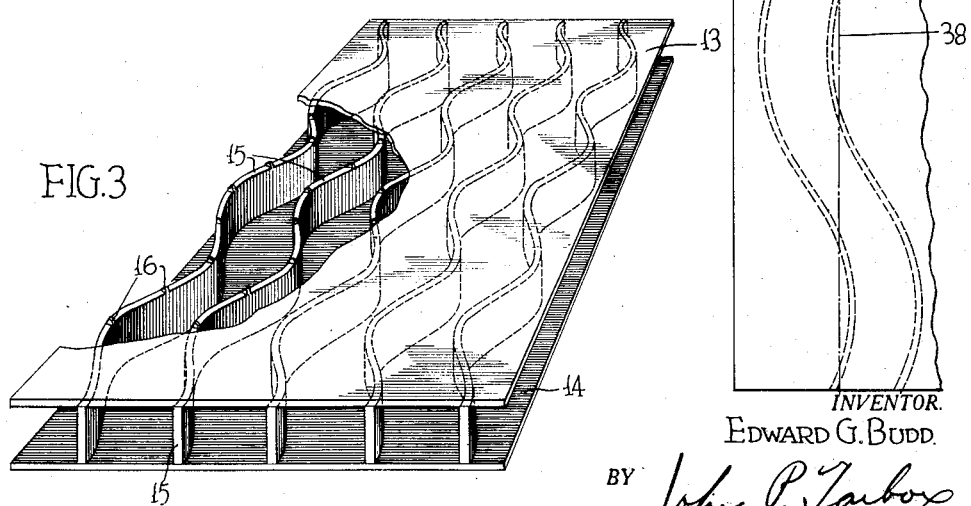
INVENTOR.
EDWARD G. BUDD.
BY John P. Tarbox
ATTORNEY.

Patented Feb. 22, 1938

2,108,795

UNITED STATES PATENT OFFICE 2,108,795

DOUBLE-WALLED SHEET METAL STRUCTURE AND METHOD OF MAKING

Edward G. Budd, Philadelphia, Pa., assignor to Edward G. Budd Manufacturing Company, Philadelphia, Pa., a corporation of Pennsylvania Application March 22, 1934, Serial No. 716,832
Renewed November 6, 1936

13 Claims. (Cl. 219—10)

This invention relates to hollow insulating metallic structures and the processes of making the same and is adapted particularly for use in the manufacture of sheet metal walls, doors and related structures.

Objects of this invention are the attainment of structures of light weight, great strength and pleasing outward appearance, which are subject to production processes resulting in economies of material and equipment for manufacturing as well as elimination of operating steps in production.

In the construction of sheet metal walls, partitions, doors, etc., it has been the common practice to provide a pair of parallel sheet metal outer members of desired shape, for the surface pieces, and various shaped metallic members interposed between these outer sheets and provided with projections at intervals and welded together, among which interposed members have been channel-shaped members and straight members utilizing tie or supporting pieces to maintain them in proper position during the assembly operations.

The present invention relates to the process of making such structures and to the structure itself, wherein the need of interposing mandrels during assembly operations is avoided, and whereby costly intermediate steps of providing auxiliary supporting structures to the spacing members during the assembly operations are similarly avoided. Other advantages of the invention will be more apparent from a reading of the following description.

I attain the foregoing desired objects and others not specifically enumerated by providing outer structural surface members with interposed sheet metal spacing members of undulating form and spud welding or projection welding the parts together.

This invention will be better understood from the attached drawing when considered in connection with the hereto appended claims and description.

Fig. 1 discloses a structure of simple form comprising a structural element incorporating the teachings of this invention.

Fig. 2 discloses a view partially in section and partially schematic showing the method of welding the assembled parts.

Fig. 3 shows in perspective a wall or similar structure according to the invention.

Fig. 4 shows one of the spacer members before assembling; and

Fig. 5 shows the undulations so conformed as to avoid a thru space between the web elements.

According to this invention, a structure having a reduced number of elemental parts and requiring a smaller number of fabricating steps, comprising a structure of great strength and light weight is attained. A simple form of the invention is shown in Fig. 1, wherein a beam, column or girder member is disclosed comprising the outer flange or chord portions 10 and 11 and the interconnecting web or member 12 of undulating form in direction of its length welded to the other two members. By the undulating form of the web 12 the interposed spacing devices which are of a width sufficient to pre-determine the distance between the outer walls, provide a simplified assembly operation. In prior art devices, wherein channel members were interposed between the parts, it was necessary to position a mandrel within the side walls of the channel during the assembling and welding operations to avoid crushing and distortion of the parts. Where sheet metal members longitudinally straight were utilized, it was necessary to maintain these members in position by auxiliary tie or support members which entailed a change in the configuration of the elemental parts of the structure or required subsidiary steps to retain them in position during assembly. By the undulating form of the present structure the foregoing expensive operations are eliminated and the spacing members 12 having been placed between the outer wall, their undulating form insures their retention in proper position without collapse and insures the maintenance of a hollow structure of great strength.

In Fig. 3 the invention is applied to a wall, partition or similar structure comprising outer members 13 and 14, respectively, and a plurality of interposed sheet metal members 15 similar in configuration to that of Fig. 1. In Fig. 3 the undulations of the plurality of spacing members are preferably positioned in a plane transverse to their longitudinal extent to thereby provide a uniform hollow section throughout the structure. It is conceivable that under some conditions of work, however, that this uniform structure may be dispensed with and a positioning of the crests of the undulations at points not correlated with each other may be desirable. A partial spacer member, partly in section, is shown in Fig. 4, wherein the width of the member is definitely predetermined and a plurality of spuds or raised portions 16 are shown spaced along the edge portions of the member.

A schematic illustration of the method of assembly is shown in Fig. 2, wherein the spacing member or members 15 is interposed between surface members 13 and 14, providing spaced intervals 17 between the various members due to the spaced positioning of the surface members from the spacing devices by means of the spuds or projections 16. The undulating contour of the spacing member 15, avoids the need of tie members between adjacent spacers as the undulating contour retains the spacer in upright position. As the spacing members are straight in transverse cross section mandrels are not necessary to retain the same in proper form. The final operation whereby the parts are secured together is attained through a plurality of electrode elements 18 and 19 respectively of platen or roller type spaced above and below the assembled parts and connected by suitable leads 20 and 21 to the secondary 22 of a welding transformer 23. The primary circuit 24 of this transformer is controlled by any suitable devices providing the equipment with high speed, accurately controlled, effective welding impulses of large current and short duration. In this manner a plurality of welds are attainable at one and the same time. Two welds are preferably made one at each side of the member 15, whereby it is secured to the outer members as at 30 and 34. These dual welds occur simultaneously. To accomplish greater economy and more speed in the assembly operations, the dies are made of commensurate relation such that a plurality of these dual welds occurs. It is thus seen that, for example, at the points 30, 31, 32 and 33; and 34, 35, 36 and 37, many joints are attained at one time.

The showing of Fig. 5 is a plan view, wherein the undulations of the members 15 are so positioned that a plane transverse the outer members 13 along line 38 will interest alternatively the undulations of one web then the next. The undulations, in amplitude and depth, are variable and the number of spuds charging the loading per weld.

Modifications within the true spirit and scope of my invention are intended to be covered by the hereto appended claims.

What I claim is:

1. The method of fabricating an insulated wall structure comprising spaced inner and outer walls and sheet metal strips, of undulating form in direction of length, whereby they stand on edge of themselves, spacing the walls apart and connecting them together through their edges per se, which comprises providing the strips with closely spaced edge projections in the plane of the strip prior to assembly of the parts in spaced relation, spacing the strips with their undulations parallel and spaced apart a distance not greater than twice their amplitude of undulation and thereafter projection welding the parts together by applying appropriate pressure at right angles to the wall structure over an extended but fractional area including a multiplicity of projections and passing current through the structure from exterior sheet to exterior sheet whereby a multiplicity of resistance welds spaced in a multiplicity of directions are simultaneously achieved throughout the same at the projections at opposite margins of the spacing strips.

2. As an article of manufacture, a composite sheet metal structural element having the characteristics of a beam or column comprising a pair of chord members of sheet metal and a longitudinally undulating web member of sheet metal connecting edgewise with the chord members and resistance welded thereto at spaced points through its edge per se by a series of welds including the peaks of the undulations and several points between.

3. As an article of manufacture, a self-sustaining metallic wall structure comprising exterior sheets of metal forming inner and outer faces of the wall spaced apart and secured together through a plurality of spacing strips of undulating form, the undulations of a plurality of adjacent strips being of amplitude and spacing as to be commonly intersected by a plane passed longitudinally of the strips transversely of the wall.

4. As an article of manufacture, a self-sustaining metallic wall structure comprising exterior sheets of metal forming inner and outer faces of the wall spaced apart and secured together through a plurality of spacing strips of undulatory form arranged wth the undulations of different strips parallel, said spacing strips being secured at their edges to the exterior sheets.

5. As an article of manufacture, a self-sustaining metallic wall structure comprising exterior sheets of metal forming inner and outer faces of the wall spaced apart and secured together through a plurality of spacing strips of undulatory form arranged with the undulations of different strips parallel, said spacing strips being secured at their edges to the exterior sheets and spaced within a distance not greater than twice the amplitude of undulation.

6. As an article of manufacture, a self-sustaining metallic wall structure comprising exterior sheets of metal forming inner and outer faces of the wall spaced apart and secured together through a plurality of spacing strips of undulatory form arranged with the undulations of different strips parallel, said spacing strips being secured at their edges to the exterior sheets by welding and spaced sufficiently close in proportion to the gauge of the exterior sheets to hold the exterior sheets in a substantially flat plane.

7. As an article of manufacture, a self-sustaining metallic wall structure comprising exterior sheets of metal forming inner and outer faces of the wall spaced apart and secured together through a plurality of spacing strips of undulatory form arranged with the undulations of different strips parallel, said spacing strips being secured at their edges to the exterior sheets by a spaced series of projection welds spaced sufficiently close to preserve substantially the undulatory form of the spacing strips.

8. As an article of manufacture, a self-sustaining metallic wall structure comprising exterior sheets of metal forming inner and outer faces of the wall spaced apart and secured together through a plurality of spacing strips of undulatory form spaced apart substantially throughout their length and secured at their edges to the exterior sheets.

9. As an article of manufacture, a self-sustaining metallic wall structure comprising exterior sheets of metal forming inner and outer faces of the wall spaced apart and secured together through a plurality of spacing strips of undulatory form extending in substantially the same direction and non-contiguous.

10. As an article of manufacture, a self-sustaining metallic wall structure comprising exterior sheets of metal forming inner and outer faces of the wall spaced apart and secured together through a plurality of spacing strips of undulatory form arranged to extend in the same direction and out of contact with each other, said spacing strips being secured at their edges to the exterior sheets by a spaced series of projection welds spaced sufficiently close to preserve substantially the undulatory form of the spacing strips.

11. The method of fabricating an insulated wall structure comprising spaced inner and outer walls, and sheet metal strips of undulating form in direction of length, whereby they stand on edge of themselves, spacing the walls apart and connecting them together through their edges per se, which comprises providing the strips with spaced edge projections substantially in the plane of the strip prior to assembly of the parts in spaced relation, spacing the strips apart throughout their length and thereafter projection welding the parts together by applying appropriate pressure at right angles to the wall structure over an extended but fractional area including a multiplicity of projections, and passing current through the structure from exterior sheet to exterior sheet whereby a multiplicity of resistance welds spaced in a multiplicity of directions are simultaneously achieved throughout the area at the projections at opposite margins of the spacing strips.

12. As an article of manufacture, a composite sheet metal structural element having the characteristics of a beam or column comprising a pair of chord members of sheet metal and a plurality of longitudinally undulating web members of sheet metal connecting edgewise with the chord members spaced apart throughout their length and resistance welded to the chord members at spaced points through their edges per se by a series of welds including the peaks of the undulations.

13. As an article of manufacture, a composite sheet metal structural element having the characteristics of a beam or column comprising exterior sheets of metal forming inner and outer faces of the composite structural element and spaced apart and secured together through a plurality of spacing strips of undulatory form, spaced apart substantially throughout their length and secured at their edges to the exterior sheets.

EDWARD G. BUDD.